United States Patent
Nguyen et al.

(10) Patent No.: US 8,749,142 B2
(45) Date of Patent: Jun. 10, 2014

(54) EXTERIOR VEHICLE LIGHTS

(75) Inventors: Viet Hoang Nguyen, Leuven (BE);
Pascal Bancken, Opwijk (BE); Radu Surdeanu, Roosbeek (BE)

(73) Assignee: NXP B.V., Eindhoven (NL)

( * ) Notice: Subject to any disclaimer, the term of this patent is extended or adjusted under 35 U.S.C. 154(b) by 156 days.

(21) Appl. No.: 13/378,052

(22) PCT Filed: Jun. 9, 2010

(86) PCT No.: PCT/IB2010/052561
§ 371 (c)(1),
(2), (4) Date: Dec. 14, 2011

(87) PCT Pub. No.: WO2010/150121
PCT Pub. Date: Dec. 29, 2010

(65) Prior Publication Data
US 2012/0086335 A1    Apr. 12, 2012

(30) Foreign Application Priority Data
Jun. 24, 2009    (EP) ...................................... 09163676

(51) Int. Cl.
*B60Q 1/26* (2006.01)
*B60Q 1/44* (2006.01)
*B60Q 1/30* (2006.01)

(52) U.S. Cl.
USPC .................. 315/77; 315/80; 315/65; 315/294

(58) Field of Classification Search
USPC ........... 315/77, 80, 82, 294, 297, 307, 65, 74, 315/120, 121; 362/234
See application file for complete search history.

(56) References Cited

U.S. PATENT DOCUMENTS

| | | | | |
|---|---|---|---|---|
| 7,528,553 | B2 * | 5/2009 | Ito et al. | 315/291 |
| 7,635,952 | B2 * | 12/2009 | Takeda et al. | 315/80 |
| 8,534,914 | B2 | 9/2013 | Nguyen Hoang et al. | |
| 2006/0114108 | A1 | 6/2006 | Counts | |
| 2006/0227085 | A1 | 10/2006 | Boldt, Jr. et al. | |
| 2007/0085494 | A1 * | 4/2007 | Takeda et al. | 315/316 |
| 2007/0170876 | A1 * | 7/2007 | Ito et al. | 315/312 |
| 2008/0055896 | A1 | 3/2008 | Feldmeier | |
| 2008/0129483 | A1 | 6/2008 | Wen | |
| 2011/0031903 | A1 | 2/2011 | Nguyen Hoang et al. | |

FOREIGN PATENT DOCUMENTS

| | | |
|---|---|---|
| CN | 2438118 Y | 7/2001 |
| CN | 1732099 A | 2/2006 |
| CN | 1781135 A | 5/2006 |

(Continued)

OTHER PUBLICATIONS

International Search Report and Written Opinion for Patent Application No. PCT/IB2010/052561 (Aug. 19, 2010).

*Primary Examiner* — Daniel D Chang

(57) ABSTRACT

A lighting system for exterior lights of an automobile comprises a first lighting unit (10,12,14,16) primarily for outputting a first automotive light signal and a failure detection system (26) for detecting a failure of the first lighting unit (10,12,14,16). A second lighting unit is primarily for outputting a second automotive light signal. The second lighting unit comprises an LED light unit. A controller (30) is adapted to determine if there is failure of the first lighting unit, and if there is failure of the first lighting unit, to use the second lighting unit to generate the first automotive light signal. This is in response to an output request from the first lighting unit (10,12,14,16).

19 Claims, 1 Drawing Sheet

(56) References Cited

FOREIGN PATENT DOCUMENTS

| | | |
|---|---|---|
| GB | 2 139 340 A | 11/1984 |
| GB | 2 418 244 A | 3/2006 |
| WO | 2004/060716 A1 | 7/2004 |
| WO | 2005/018988 A1 | 3/2005 |
| WO | 2010/150119 A2 | 12/2010 |

* cited by examiner

EXTERIOR VEHICLE LIGHTS

This invention relates to lighting devices using light emitting diodes (LEDs).

LEDs are more and more used in automotive lighting. LEDs are now found in lighting modules of cars that were previously exclusively reserved for filament light bulbs. A third (central) brake light in vehicles is now commonly implemented with LED technology, and it is expected that LEDs will in future be used for all light units.

The efficiency, durability and small form factor of LEDs is particularly attractive for car lighting modules.

Currently, the rear light module of a car for the European market typically contains four different segments with distinctive colours:

(1) main rear light—red,
(2) reversing light—white,
(3) indicator—orange, and
(4) break light—red.

The conventional light source in this lighting fixture is the filament light bulb, and to create the correct light colour, the light covers are made of coloured plastic. This simple design of car rear light is inefficient in term of light generation because the filament light bulb is inefficient (luminous efficacy of less than 4%), and the use of a colour filter further reduces the light flux to the outside.

When LEDs are designed in a car rear light module, a colour LED (red/orange/white) is used in combination with clear light module cover. This new design offers not only a new look to the car but also a better lighting efficiency. However, the use of a specific colour LED for a specific segment of the rear light module has two disadvantages. Firstly, the light sources of different segments of the rear light module are not interchangeable posing a logistic problem.

Secondly, despite the long life time of LEDs, failure can ultimately occur to one of the signal lights. As for conventional filament lights, the failed lighting unit will be out of service posing a serious safety risk to the car driver and passengers.

According to the invention, there is provided a lighting system for exterior lights of an automobile, comprising:

a first lighting unit primarily for outputting a first automotive light signal;

a failure detection system for detecting a failure of the first lighting unit;

a second lighting unit primarily for outputting a second automotive light signal, wherein the second lighting unit comprises an LED light unit; and a controller, wherein in response to a requested output from the first lighting unit, the controller is adapted to determine if there is failure of the first lighting unit, and if there is failure of the first lighting unit, to use the second lighting unit to generate the first automotive light signal.

In this system, once a failure is detected in the first lighting unit, another unit (for example adjacent to the first) can be activated to take over the signalling job of the failed lighting unit. This ensures that safety of the car driver and passengers are maintained. Preferably, a warning message is then sent to the car driver reminding of the need to go to the garage to change the failed light unit. However, the signalling system of the car can keep on functioning correctly.

Thus, the safety of the car lighting unit is increased.

Preferably, the first and second automotive light signals each comprise a different one of an indicator light, a main light, a reverse light and a brake light. These are the main exterior rear light functions.

The second lighting unit preferably comprises an LED cluster which is controllable to output one of a plurality of colours. This means it can be used to take over for different failed lighting units of different colours. For example, the first automotive light signal can have a first colour and the second automotive light signal can have a second colour, and the second lighting unit is controllable to output either of the first and second colours as required.

The colours used in automotive lighting are red orange and white. Thus, the LED cluster can preferably generate these three colours. For example, the second lighting unit can comprise a cluster of three LEDs of different primary colours such as red, green and blue.

In a most basic implementation, the first lighting unit comprises a filament bulb. Thus, an LED cluster is used for one light (for example the brake light) and this acts as a reserve in the event of failure of other conventional bulbs. In this case, the failure detection system can be for detecting an open circuit of the filament bulb circuit.

Instead, the first lighting unit can comprise an LED cluster which is controllable to output one of a plurality of colours. Thus, the lighting system has multiple LED clusters, for example each having LEDs of different primary colours.

In this case, the failure detection system can comprise an optical feedback sensor for detecting the output colour of the LED cluster, although electrical detection can also be used.

In one arrangement, the system comprises a rear light cluster for a vehicle, with respective lighting units primarily allocated to each of the automotive light signals of indicating, reversing, braking and main lighting, and each lighting unit comprises an LED cluster. The failure detection system is then for detecting failure in any of the LED clusters, and the controller is for allocating a non-failed LED cluster to the respective automotive light signal of the failed LED cluster.

This provides significant flexibility and also reduces the level of complexity in manufacturing and distributing automotive light sources, because one LED cluster can perform different roles in signalling.

The colour of the light output from each LED cluster can be electronically determined. This means the same cluster can emit all the necessary signal light colours needed from a car.

The invention also provides a method of controlling the exterior lights of an automobile, comprising:

detecting a failure of a first lighting unit, wherein the first lighting unit is primarily for outputting a first automotive light signal;

using a second lighting unit to generate the first automotive light signal, wherein the second lighting unit is primarily for outputting a second, different, automotive light signal, wherein the second lighting unit comprises an LED light unit.

The first and second automotive light signals can each comprise a different one of an indicator light, a main light, a reverse light and a brake light.

The first automotive light signal can have a first colour and the second automotive light signal can have a second colour, and wherein the second lighting unit is controllable to output either of the first and second colours as required.

The method can further comprise applying a priority scheme to determine the output of the second lighting unit when both the first and second automotive light signals are desired. Thus, a priority system can be used to determine the safest output signals in the event that the failure means that not all desired signals can be provided.

Examples of the invention will now be described with reference to the accompanying drawings, in which.

The invention provides a vehicle lighting system in which one or more of the lighting units can be allocated to multiple light output functions, so that it can enable the overall light output function to be maintained even when one of the lighting units fails.

Figure 1:
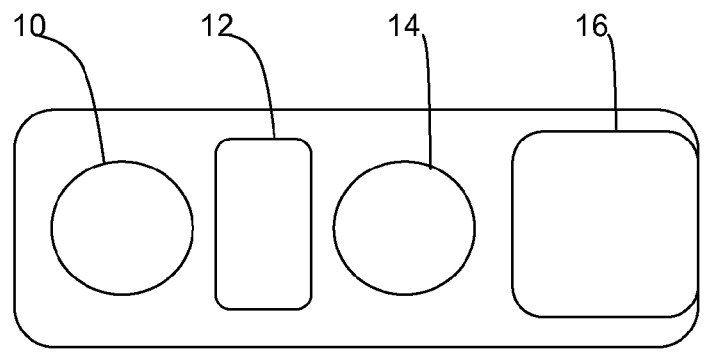
FIG. 1 shows a rear light cluster of a vehicle.

FIG. 1 shows a rear light cluster of a vehicle.

The light cluster comprises a red brake light 10, a white reversing light 12, a red normal light 14 and an orange indicator light 16.

Figure 2:
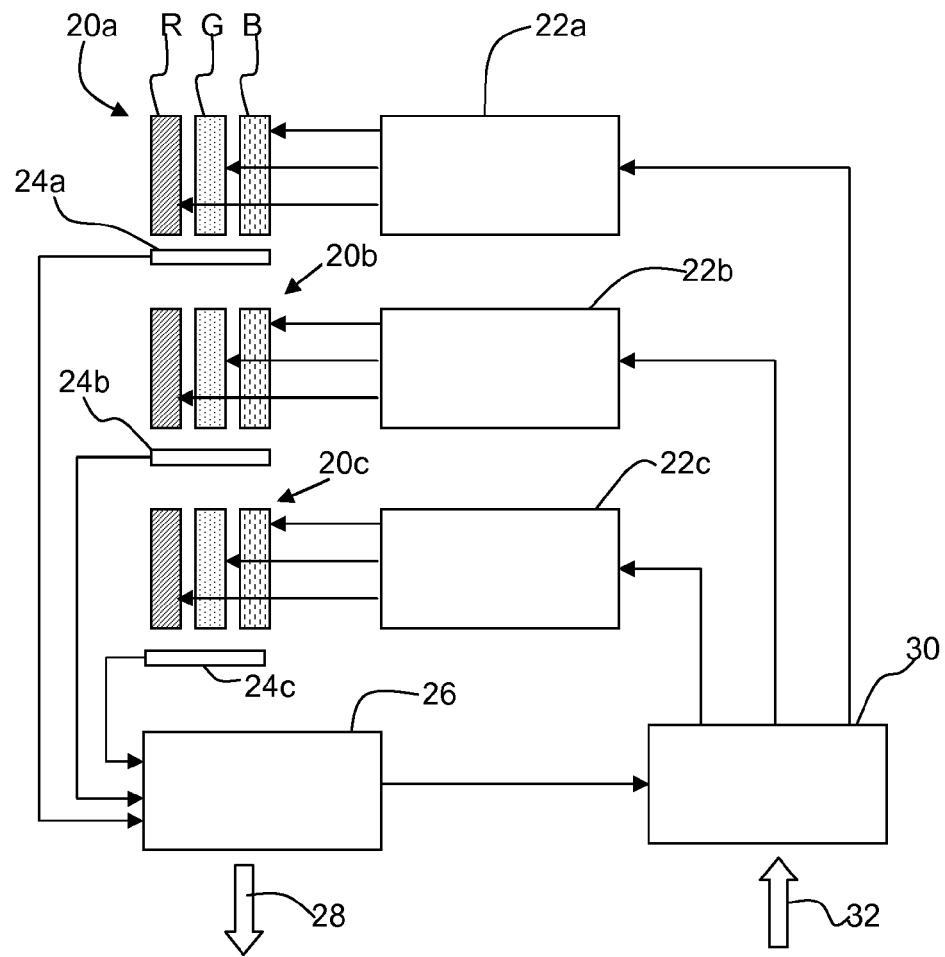
FIG. 2 shows a system of the invention which can for example be used to implement the light cluster.

FIG. 2 shows a system of the invention which can for example be used to implement the light cluster.

As will be discussed below, the invention can be implemented in different levels. A basic level can use filament lamps, and requires only one LED cluster lamp, which then can provide the function of reserve lighting unit for any other failed lamp. A full implementation has all lights implemented as LED clusters, and this full implementation will first be described with reference to FIG. 2.

FIG. 2 shows three lighting units 20a, 20b, 20c, each implemented as a cluster of three LEDs, of primary colours, for example red (R) green (G) and blue (B).

The light output colour from each lighting unit is electronically determined by a respective LED driver 22a, 22b, 22c.

Each lighting unit has a sensor 24a, 24b, 24c. This can detect failure in one or more of the LEDs by a change in the output colour for given drive conditions. However, other detection mechanisms can be used for detecting LED failure, for example open circuit detection.

Upon detection of the failure or failures in one of the LED clusters, an adjacent lighting unit is activated to take over the signalling job of the failed lighting unit with the correct light colour and intensity. A warning message is then sent out to the driver while the system remains functional.

To implement this function, the sensor signals are supplied to a failure detection unit 26 which gives the warning signal 28, but also provides this information to a system controller 30.

The system controller 30 processes the light output requests 32 (i.e. the signals indicating that the brake pedal is pressed, the indicator is on, the lights are on or the gear is reverse) based on knowledge of the current failures, so that the desired output signals can be generated even in the event of one or more failed lighting units 20a, 20b, 20c. The required colour of the light output is also determined by the controller.

If there is a detected failure on the light unit primarily allocated to a desired signal (for example the brake light), the controller decides which alternative lighting unit should be used. If need be, a lighting unit can be required to provide a combination of light signals like orange blinking and a red braking signal.

The values of the required drive currents are determined based on the requested light signal colour. These values are then sent to the driver 22 of the targeted light unit. From the driver circuit 22, appropriate currents are sent to the LEDs completing the task of conveying the signal.

This system can have all lighting units of the same design, and this reduces cost and complexity. It also gives the most options for enabling the required light output to be generated even in the event of failure of one or more lighting units.

The failure can be detected at the level of the individual LEDs of the light clusters.

The detection of the LED function can be carried out in entirely conventional manner, for example based on measurement of the electrical properties (e.g. resistance) of the LED. Similarly, the control of the output colour of an LED cluster can be conventional, and can for example include compensation for temperature.

The light output intensity of the LED cluster can be controlled in conventional manner by either:

(a) regulating the amplitude of the current through the LED, or (b) regulating the frequency and duty cycle of a current pulse through the LED.

A combination of both techniques can also be used.

The system above uses all LED light clusters. A simpler implementation can have only one LED cluster, for example with only the reverse light module as an LED cluster. The other light modules can comprise filament bulbs. The failure detection of filament bulbs based on open or short circuit detection already exists in many vehicles, and this enables the system to be installed with minimum alteration to conventional systems.

External optical sensors can also be used for detection of the lighting unit function (both for filament bulbs and for LED clusters).

The invention can be used in many different light signal systems, such as rear lights of transportation vehicles. However, it can also be applied to the front light modules (side lights, main light dipped, main light full beam and indicator). The front and rear light clusters may of course also include fog lights.

The use of one lighting unit to act as the reserve for another can be under the control of a priority scheme. This can take account of all possible failures and all possible desired outputs (e.g. braking and indicating at the same time, with the lights on). The various possible combinations can then be used to provide the safest possible light output from the vehicle. If there are two failures, the priority scheme will then determine which is the more important light signal to provide (for example a brake light output will have priority over the normal light output).

An LED cluster can have any number of LEDs, not only three as in the example above.

Various modifications will be apparent to those skilled in the art.

The invention claimed is:

1. An LED lighting system for exterior lights of an automobile, comprising:
    a first lighting unit primarily for outputting a first automotive light signal;
    a failure detection system for detecting a failure of the first lighting unit;
    a second lighting unit primarily for outputting a second automotive light signal, wherein the second lighting unit comprises an LED light unit; and
    a controller circuit,
    wherein, in response to concurrently-requested outputs from the first lighting unit and the second lighting unit, the controller circuit is adapted to determine if there is failure of the first lighting unit, and if there is failure of the first lighting unit, determine whether to apply the first automotive light signal or the second automotive light signal based upon respective priorities of the automotive light signals, and to use the second lighting unit to generate the first automotive light signal in response to determining that the first automotive light signal has a higher priority than the second automotive light signal.

2. A system as claimed in claim 1, wherein the first and second automotive light signals each comprise a different one of an indicator light, a main light, a reverse light and a brake light.

3. A system as claimed in claim 1, wherein the second lighting unit comprises an LED cluster which is controllable to output one of a plurality of colours.

4. A system as claimed in claim 3, wherein the second lighting unit comprises a cluster of three LEDs of different primary colours.

5. A system as claimed in claim 3, wherein the first automotive light signal has a first colour and the second automotive light signal has a second colour, and wherein the second lighting unit is controllable to output either of the first and second colours as required.

6. A system as claimed in claim 1, wherein the first lighting unit comprises a filament bulb.

7. A system as claimed in claim 6, wherein the failure detection system is for detecting an open circuit of the filament bulb.

8. A system as claimed in claim 1, wherein the first lighting unit comprises an LED cluster which is controllable to output one of a plurality of colours.

9. A system as claimed in claim 8, wherein the first lighting unit comprises a cluster of three LEDs of different primary colours.

10. A system as claimed in claim 1, wherein the failure detection system comprises an optical feedback sensor for detecting the output of the first lighting unit.

11. A system as claimed in claim 1, further comprising a rear light cluster for a vehicle, with respective lighting units primarily allocated to each of the automotive light signals of indicating, reversing, braking and main lighting, wherein each lighting unit comprises an LED cluster, wherein the failure detection system is for detecting failure in any of the LED clusters, and wherein the controller circuit is for allocating a non-failed LED cluster to a respective automotive light signal of a failed LED cluster.

12. A system as claimed in claim 1, wherein the controller circuit is further configured and arranged to use the second lighting unit to generate the second automotive light signal in response to determining that the second automotive light signal has a higher safety priority than the first automotive light signal.

13. A system as claimed in claim 1, wherein the controller circuit is further configured and arranged to apply a combination lighting scheme wherein the second lighting unit simultaneously provides a combination of automotive light signals when both the first and second automotive light signals are requested outputs.

14. A method of controlling exterior lights of an automobile, comprising:
    detecting a failure of a first lighting unit, wherein the first lighting unit is primarily for outputting a first automotive light signal; and
    in response to concurrently-requested outputs of the first automotive light signal and a second, different automotive light signal, determine whether to apply the first automotive light signal or the second automotive light signal based upon respective priorities of the automotive light signals, and using a second lighting unit to generate the first automotive light signal in response to determining that the first automotive light signal has a higher priority than the second automotive light signal,
    wherein the second lighting unit is primarily for outputting the second, different, automotive light signal.

15. A method as claimed in claim 14, wherein the first and second automotive light signals each comprise a different one of an indicator light, a main light, a reverse light and a brake light.

16. A method as claimed in claim 15, wherein the first automotive light signal has a first colour and the second automotive light signal has a second colour, and wherein the second lighting unit is controllable to output either of the first and second colours as required.

17. A method as claimed in claim 14, further comprising applying the priorities to determine the output of the second lighting unit when both the first and second automotive light signals are requested outputs, and to use the second lighting unit to generate the second automotive light signal in response to determining that the second automotive light signal has a higher safety priority than the first automotive light signal.

18. A method as claimed in claim 17, wherein the output of the second lighting unit is a prioritized signal of the requested light signals.

19. A method as claimed in claim 14, further comprising applying a combination lighting scheme wherein the second lighting unit simultaneously provides a combination of automotive light signals when both the first and second automotive light signals are requested outputs.

* * * * *